US008931791B2

(12) United States Patent
Matsushima et al.

(10) Patent No.: US 8,931,791 B2
(45) Date of Patent: Jan. 13, 2015

(54) VEHICLE BODY FRAME AND REAR FENDER ASSEMBLY FOR A MOTORCYCLE, AND MOTORCYCLE INCLUDING SAME

(75) Inventors: Satoshi Matsushima, Saitama (JP); Yusuke Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 13/425,453

(22) Filed: Mar. 21, 2012

(65) Prior Publication Data
US 2012/0248734 A1 Oct. 4, 2012

(30) Foreign Application Priority Data

Mar. 29, 2011 (JP) ................................. 2011-071684

(51) Int. Cl.
| | | |
|---|---|---|
| *B62J 15/02* | (2006.01) | |
| *B62J 37/00* | (2006.01) | |
| *B62J 15/00* | (2006.01) | |
| *B62K 11/04* | (2006.01) | |

(52) U.S. Cl.
CPC ...... *B62J 37/00* (2013.01); *B62J 15/00* (2013.01); *B62K 11/04* (2013.01)
USPC ....................................... 280/152.3; 180/219

(58) Field of Classification Search
CPC ................................. B62J 15/00; B62J 15/02
USPC ..................... 280/847, 152.1, 152.3; 180/219
See application file for complete search history.

(56) References Cited

U.S. PATENT DOCUMENTS

| | | | | |
|---|---|---|---|---|
| 6,520,275 | B2 * | 2/2003 | Galbraith et al. | ............. 180/219 |
| 6,679,347 | B2 * | 1/2004 | Iimuro | ........................ 180/219 |
| 7,036,837 | B1 * | 5/2006 | Bauer et al. | ................ 280/288.4 |
| 7,766,355 | B2 * | 8/2010 | Ichihara | .................... 280/152.3 |
| 2005/0051374 | A1 * | 3/2005 | Nakano et al. | ................ 180/219 |
| 2006/0278456 | A1 * | 12/2006 | Desrosiers | .................... 180/219 |

FOREIGN PATENT DOCUMENTS

| | | | |
|---|---|---|---|
| JP | 08-034378 A | | 2/1996 |
| JP | 2011156886 A | * | 8/2011 |
| JP | 2013226927 A | * | 11/2013 |

\* cited by examiner

*Primary Examiner* — Kevin Hurley
(74) *Attorney, Agent, or Firm* — Carrier Blackman & Associates, P.C.; Joseph P. Carrier; Anne G. Sabourin (57) ABSTRACT

A motorcycle has a rear fender configured for strength and rigidity when the rear fender is lifted upwardly, while minimizing mass thereof. The motorcycle includes main frame sections extending rearwardly from a head pipe, left and right pivot plates attached to rear ends of the main frame sections and extending downwardly, and a swing arm, having a front end supported on the pivot plates to be swingably movable thereon, and a rear end configured to support a rear wheel. The motorcycle also includes left and right seat rails for supporting a seat thereon, left and right reinforcing rods extending between the seat rails and the pivot plates, and a rear fender mounted on the seat rails above the rear wheel. The rear fender includes projecting portions supported at front end portions thereof by front mounting flanges, the projecting portions projecting forwardly and contacting the seat rails from above.

17 Claims, 7 Drawing Sheets

VEHICLE BODY FRAME AND REAR FENDER ASSEMBLY FOR A MOTORCYCLE, AND MOTORCYCLE INCLUDING SAME

CROSS-REFERENCE TO RELATED APPLICATIONS

The present invention claims priority under 35 USC 119 based on Japanese patent application No. 2011-071684, filed on Mar. 29, 2011. The entire subject matter of this priority document, including specification claims and drawings thereof, is incorporated by reference herein.

BACKGROUND OF THE INVENTION

1. Field of the Invention

The present invention relates a rear fender structure of a motorcycle having a rear fender to be mounted on a seat rail.

2. Description of the Background Art

In one known example of a rear fender structure of a motorcycle, a rear fender is fixed to a vehicle body frame by fixing a base provided on a front half portion thereof to the vehicle body frame with a screw, and a cylindrical gripping portion is formed on a rear half portion thereof (for example, see Japanese Published Patent Document JP-A-8-34378).

However, the rear fender of the related art described above is required to be relatively heavy and massive in order to secure the strength and rigidity of the rear fender, because a stress concentrates on the base provided on the front half portion thereof when the gripping portion formed on the rear half portion thereof is gripped and lifted upward.

Therefore, it would be desirable to secure an improved rear fender design which would ensure good strength and rigidity of a rear fender when the rear fender is lifted upwardly, without making the rear fender massive.

SUMMARY OF THE INVENTION

In view of such circumstances, it is an object of the present invention to provide a rear fender structure of a motorcycle in which strength and rigidity of the rear fender is provided when the rear fender is lifted upwardly, without making the rear fender massive.

In order to achieve the above-described object, the present invention provides a rear fender structure of a motorcycle including: a head pipe (14) configured to support a steering shaft via a shaft; main frame sections (15) extending rearward from the head pipe (14); a pair of left and right pivot plates (16) coupled to rear ends of the main frame sections (15) and extending downward; a swing arm (13) supported via a shaft at a front end thereof by the pivot plates (16) so as to be swingable and configured to support a rear wheel (3) at a rear end thereof via a shaft; a pair of left and right seat rails (18) configured to support a seat (25); a pair of left and right rear pipes (19) bridged between the seat rails (18) and the pivot plates (16); and a rear fender (40) to be mounted on the seat rails (18) above the rear wheel (3), wherein the rear fender (40) includes a projecting portions (58) supported at a front end portion thereof by front mounting portions (54A) and extending forward and coming into abutment with the seat rails (18) from above when mounting the rear fender (40).

In this configuration, the rear fender to be mounted on the seat rails includes the projecting portions supported at the front end portions thereof by the front mounting portions, and extending forward and coming into abutment with the seat rails from above when mounting the rear fender. Therefore, when rear portions of the projecting portions are gripped and a force to lift the same upward acts thereon, the projecting portions come into abutment with the seat rails from above, and work to resist this force. Therefore, with the provision of the projecting portions extending forward on the rear fender, the strength and rigidity of the rear fender when the rear fender is lifted upward can be secured without making the rear fender massive.

In the configuration described above, a configuration in which the rear fender (40) is mounted by fastening the front mounting portions to the seat rails (18) with bolts (44A), is supported by fastening rear mounting portions (57) provided rearward of the front mounting portions (54A) and rear ends of the left and right seat rails (18) with bolts (45A) from the lateral sides, and the projecting portions (58) are formed on the rear mounting portions (57) and extend toward the front is also applicable.

In this case, the rear fender is mounted by fastening the front mounting portions thereof to the seat rails with the bolts and then is supported by fastening the rear mounting portions provided rearward of the front mounting portions and the rear ends of the left and right seat rails by the bolts from the lateral sides, and the projecting portions are formed on the rear mounting portions and extend forward. Therefore, when the rear portions of the rear mounting portions are gripped and a force to lift the same upward acts thereon, the projecting portions come into abutment with the seat rails from above, and work to resist this force. Therefore, the strength and rigidity of the rear fender when the rear fender is lifted upward can be secured without making the rear fender massive.

Also, a configuration in which the rear fender (40) is formed with gripping portions (56) formed into depressions in the bottom view rearward of the rear mounting portions (57), the rear mounting portions (57) are ribs extending in forward and backward, the rear mounting portions (57) are formed with the projecting portions (58) on the front portions thereof, and the rear portions are coupled to the gripping portions (56) is also applicable.

In this case, the gripping portions which are the depressions when viewed from the bottom are formed rearward of the rear mounting portions of the rear fender, the rear mounting portions are the ribs extending forward and backward, the rear mounting portions are formed with the projecting portions on the front portions thereof and are coupled to the gripping portions at the rear portions thereof, and the projecting portions on the front portions of the rear mounting portions come into abutment with the seat rails from above when gripping the gripping portions rearward of the rear mounting portions and lifting the rear fender upward. Therefore, the strength and rigidity of the rear fender when the rear fender is lifted upward can be secured without making the rear fender massive.

Also, a configuration in which each of the projecting portions (58) is formed into an L-shape in cross section by a lateral rib (60) which comes into abutment with an upper surface of the seat rail (18) and a vertical rib (61) coming into abutment with an inner side (62A) of the seat rail (18) is also applicable.

In this case, since each of the projecting portion is formed into the L-shape in cross section by the lateral rib which comes into abutment with the upper surface of the seat rail, and the vertical rib which comes into abutment with the inner side of the seat rail, the rigidity in the vertical direction and the vehicle width direction can be secured.

Furthermore, a configuration in which the lateral rib (60) is formed with plural thinned grooves (60A) extending in the lateral direction of a vehicle is also applicable.

In this case, with the provision of the plural thinned grooves extending in the lateral direction of the vehicle, a weight reduction is achieved.

Furthermore, a configuration in which side covers (38) configured to cover the sides of a vehicle body are provided, the gripping portions (56) are formed so as to have a convex shape in side view as mating portions (55) between the side covers (38) and the rear fender (40), a seat-supporting portion (53) formed into a U-shape in plan view is formed on an upper surface of the rear fender (40), and the rear mounting portions (57) and the projecting portions (58) are positioned on extensions of a ridge line (T) of the seat-supporting portion (53) having the U-shape is also applicable.

In this case, since the gripping portions are formed so as to have a convex shape in side view as the mating portions between the side covers and the rear fender, the strength and rigidity of the gripping portions can be secured. Also, since the seat-supporting portion having the U-shape in plan view is formed on the upper surface of the rear fender, and the rear mounting portions and the projecting portions are positioned on the extensions of the ridge line of the seat-supporting portion having the U-shape, the strength and rigidity of the rear mounting portion and the projecting portion can be secured.

Also, a configuration in which the side covers (38) configured to cover the sides of the vehicle body are provided, an air cleaner (32) is arranged in a space surrounded by the seat rails (18) below the seat (25) and the rear pipes (19), the rear fender (40) is fastened together to the front mounting portions (54A) with rear edge portions (32A) of the air cleaner (32), and the side covers (38) and the seat (25) are fastened together to the rear mounting portions (57) is also applicable.

In this case, even when the fixing bolts for fastening the seat, the side covers, and the rear fender of the rear mounting portions together are removed for the maintenance of the air cleaner below the seat, the rear fender is supported by the projecting portions coming into abutment with the seat rails from above, and hence good serviceability is achieved.

Also, a configuration in which guide ribs (65) extending inward of the vehicle body are formed in front and rear of bolt holes (59A) of the rear mounting portions (57) on the inside of the vehicle body is also applicable.

In this case, since the guide ribs extending inward of the vehicle body are formed in front and rear of the bolt holes of the rear mounting portions on the inside of the vehicle body, and the seat can be positioned at the positions of the bolt holes by assembling the seat along the guide ribs, so that assembly is facilitated.

In the rear fender structure of the motorcycle according to the present invention, the rear fender to be mounted on the seat rails includes the projecting portions supported at the front end portions thereof by the front mounting portions, and extending forward and coming into abutment with the seat rails from above when mounting the rear fender. Therefore, when the rear portions of the projecting portions are gripped and the force to lift the same upward acts thereon, the projecting portions come into abutment with the seat rails from above, and work to resist this force. Therefore, with the provision of projecting portions extending forward on the rear fender, the strength and rigidity of the rear fender when the rear fender is lifted upward can be secured without making the rear fender massive.

Also, since the projecting portions are formed on the rear mounting portions provided rearward of the front mounting portions and extend forward, when the rear portions of the rear mounting portion are gripped and the force to lift the same upward acts thereon, the projecting portions come into abutment with the seat rails from above, and work to resist this force. Therefore, the strength and rigidity of the rear fender when the rear fender is lifted upward can be secured without making the rear fender massive.

Also, the gripping portions are formed rearward of the rear mounting portions of the rear fender, the projecting portions are formed on the front of the rear mounting portions, and when the gripping portions rearward of the rear mounting portions are gripped and the rear fender is lifted upward, the projecting portions on the front portions of the rear mounting portions come into abutment with the seat rails from above. Therefore, the strength and rigidity of the rear fender when the rear fender is lifted upward can be secured without making the rear fender massive.

Also, since each of the projecting portions is formed into the L-shape in cross section by the lateral rib which comes into abutment with the upper surface of the seat rail and the vertical rib which comes into abutment with the inner side of the seat rail, the rigidity in the vertical direction and the vehicle width direction can be secured.

In addition, with the provision of the plural thinned grooves extending in the lateral direction of the vehicle, the weight reduction is achieved.

Still further, since the gripping portions are formed so as to have a convex shape in side view as the mating portions between the side covers and the rear fender, the strength and rigidity of the gripping portions can be secured. Also, since the seat-supporting portion having the U-shape in plan view is formed on the upper surface of the rear fender, and the rear mounting portions and the projecting portions are positioned on the extensions of the ridge line T of the seat-supporting portion having the U-shape, the strength and rigidity of the rear mounting portion and the projecting portion can be secured.

Also, even when the bolts for fastening the seat, the side covers, and the rear fender together at the rear mounting portions are removed for the maintenance of the air cleaner below the seat, the rear fender is supported by the projecting portions coming into abutment with the seat rails from above, and hence good serviceability is achieved.

In addition, since the guide ribs extending inward of the vehicle body are formed in front and rear of the bolt holes of the rear mounting portions on the inside of the vehicle body, the seat can be positioned at the positions of the bolt holes by assembling the seat along the guide ribs, so that the assembly is facilitated.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Referring now to the drawings, a rear fender of a motorcycle according to a selected illustrative embodiment of the present invention will be described. In the following description, directions such as up, down, front, rear, left, and right indicate directions viewed from vantage point of an operator of the motorcycle, seated on the seat and facing forward.

Figure 1:
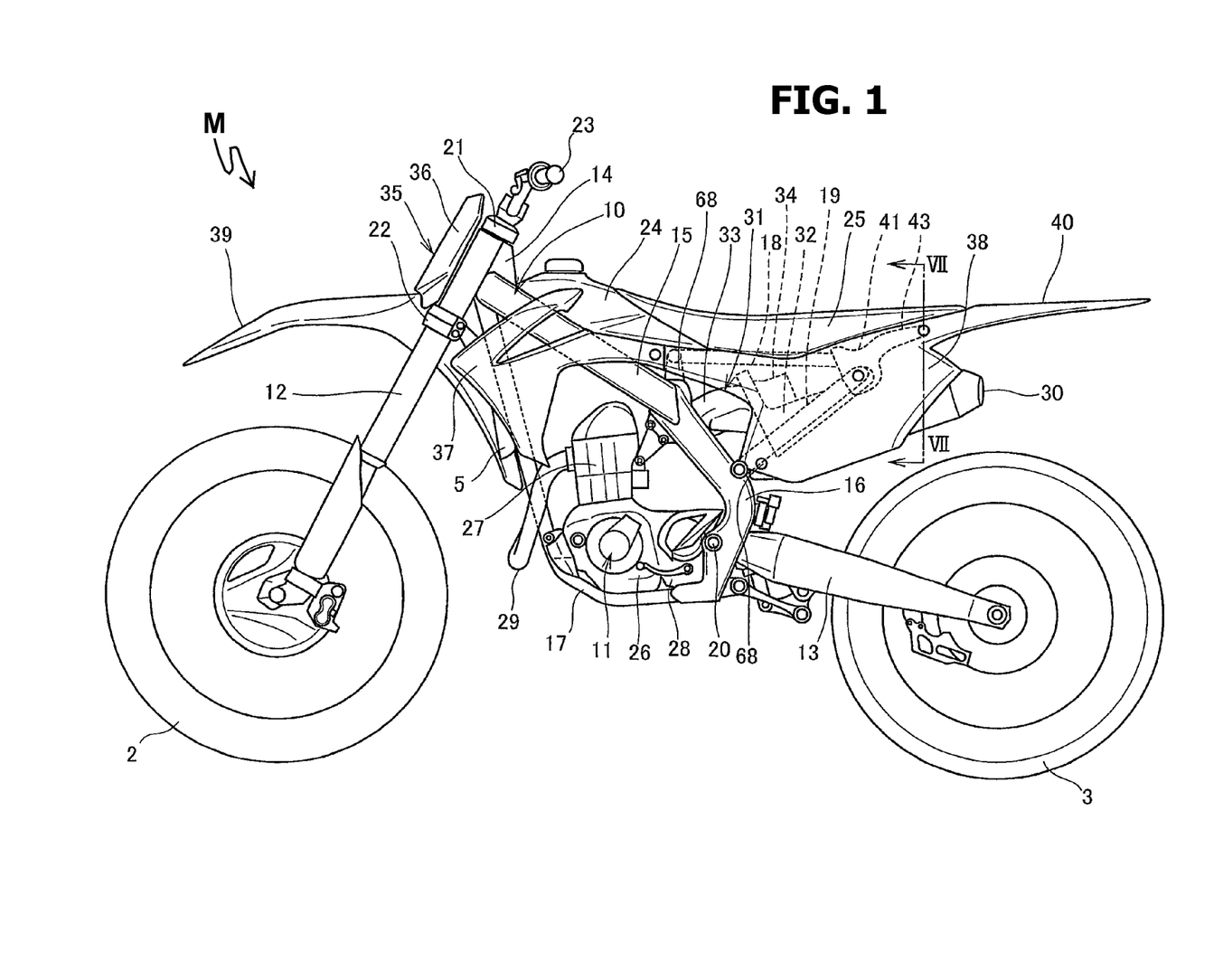
FIG. 1 is a left side view of a motorcycle according to an embodiment of the present invention.

FIG. 1 is a left side plan view of a motorcycle M according to the illustrative embodiment of the present invention. The depicted motorcycle M is an off-road saddle-type vehicle including an engine 11 arranged at a central portion, in the fore-and-aft direction, of a vehicle body frame 10. The motorcycle M also includes front forks 12 at a front end of the vehicle body frame 10 and configured to support a front wheel 2 so as to be steerable, and a swing arm 13 provided at a lower rear portion of the vehicle body frame 10 and configured to rotatably support a rear wheel 3 thereon via an axle shaft.

The vehicle body frame 10 includes a head pipe 14 configured to support the pair of left and right front forks 12, a pair of left and right main frame sections 15 extending rearwardly and downwardly from the head pipe 14, and a pair of left and right pivot plates 16 extending rearwardly and downwardly from rear ends of the main frame sections 15, and then curving forwardly and extending downward. The vehicle body frame 10 also includes a lower frame member 17 extending downwardly from the head pipe 14 below the main frame sections 15. The lower frame member 17 forks into two parts and is branched leftward and rightward in front of the engine 11, then these branched parts extend below the engine 11, and are coupled to lower ends of the pivot plates 16.

The vehicle body frame 10 also includes a pair of left and right seat rails 18 extending substantially horizontally rearward from upper end portions of the pivot plates 16, and a pair of left and right reinforcing rods 19 (FIG. 2), extending between intermediate portions of the pivot plates 16 in the vertical direction and rear portions of the seat rails 18.

The pivot plates 16 are provided with a pivot shaft 20 penetrating therethrough in the vehicle width direction via accommodation holes provided therein, and the swing arm 13 is supported on the pivot shaft 20 so as to be swingable. The rear wheel 3 is supported at a rear end of the swing arm 13 via an axle shaft.

The head pipe 14 includes a steering shaft (not shown) pivotally supported therein, and the front fork 12 is connected to a top bridge 21 and a bottom bridge 22 coupled to an upper end and a lower end of the steering shaft. A steering handlebar 23 is mounted on the top bridge 21.

A fuel tank 24 is fixed above the main frame sections 15 so as to extend along the main frame sections 15, and a seat 25 on which the rider is seated continues from a rear portion of the fuel tank 24 and extends rearward by being supported by the seat rails 18.

The engine 11 includes a crankcase 26 in which a crankshaft (not shown), extending in the vehicle width direction is accommodated, and a cylinder 27 extending upward from a front portion of the crankcase 26 slightly obliquely toward the front. The engine 11 is supported between the main frame sections 15 and the branched lower frame member 17. A transmission 28 is integrally provided at a rear portion of the crankcase 26.

An exhaust pipe 29 is connected to a front portion of the cylinder 27, and the exhaust pipe 29 is bent toward the right side, extends rearward, and is bifurcated to be connected to a pair of left and right mufflers 30 provided below the seat rails 18.

An air-intake apparatus 31 is arranged rearward of the cylinder 27, and is configured to supply fuel and air to the engine 11. An air cleaner box 32 (an air cleaner) which serves as an outside-air intake port of the air-intake apparatus 31 is arranged in a space surrounded by the left and right seat rails 18 and the reinforcing rods 19, and a connecting duct tube 33, extending toward the cylinder 27, is connected to a front portion of the air cleaner box 32.

The motorcycle M includes a vehicle body cover 35 formed of a resin, and the vehicle body cover 35 includes a front cover 36 configured to cover the front of the head pipe 14, a pair of left and right shrouds 37 configured to cover the top portion of the lower frame member 17 and lateral sides of the main frame sections 15. The vehicle body cover 35 also includes a pair of left and right side covers 38, which are configured to cover the air cleaner box 32, the mufflers 30, and the like from the lateral sides under the seat 25. The shrouds 37 are fastened to a radiator 5, and the fuel tank 24 is attached to the lower frame member 17.

A front fender 39 configured to cover the front wheel 2 from above is fixed to the bottom bridge 22, and a rear fender 40 configured to cover the rear wheel 3 from above is provided rearward of the seat 25. The front fender 39 and the rear fender 40 are formed of a resin.

Figure 2:
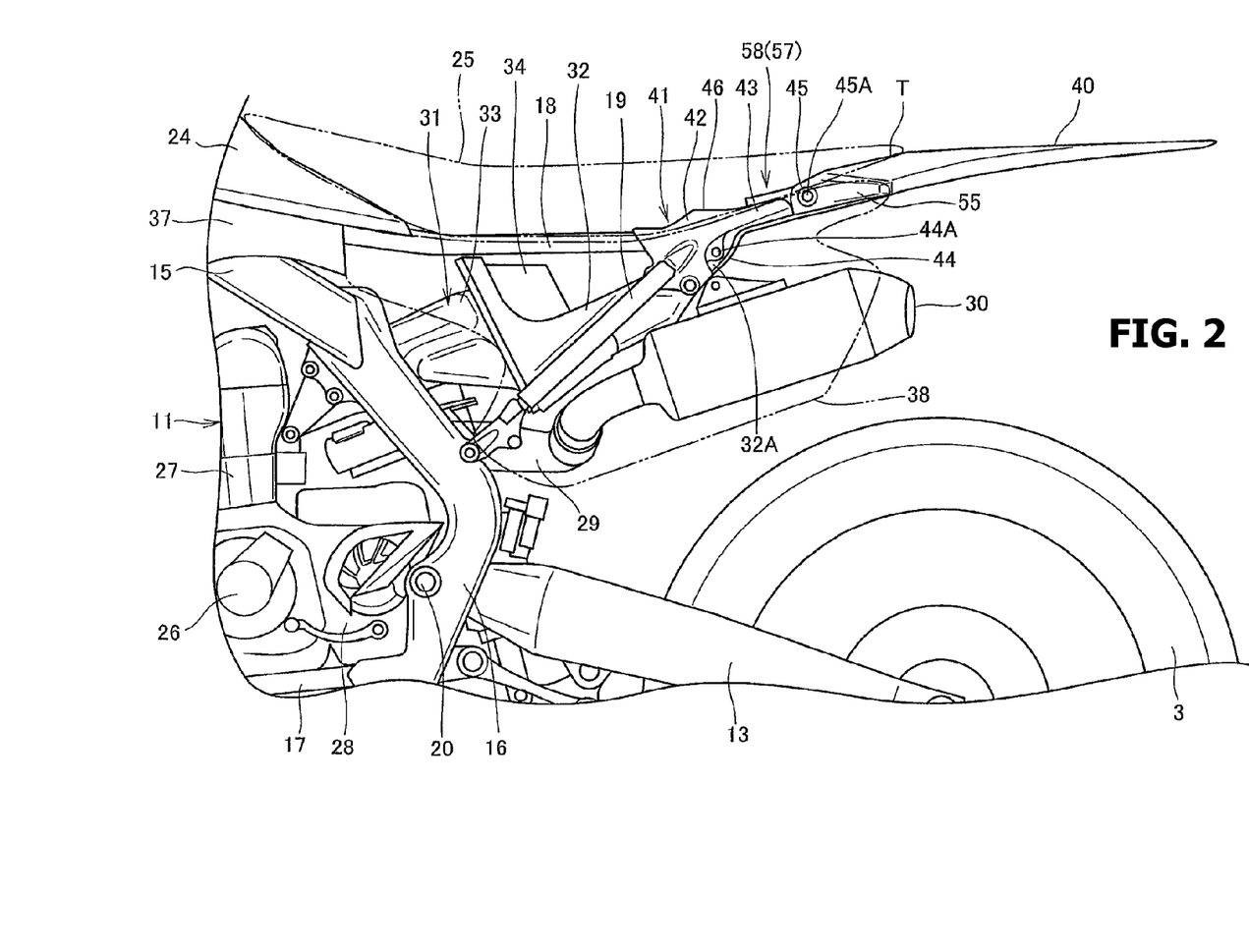
FIG. 2 is a left side view of a rear portion of the motorcycle.

FIG. 2 is a left side view of a rear portion of the motorcycle 1. In FIG. 2, the seat 25 and the side cover 38 are illustrated by double-dashed chain lines.

As shown in FIG. 2, the left and right seat rails 18 include plate-shaped stay plates 41 at the rear portions thereof in side view. Each of the stay plates 41 includes a plate portion 42 to which the rear pipe 19 is coupled and a rod-shaped rear extending portion 43 extending rearward from the plate portion 42 on an outer side surface thereof. A fastening portion 44 to which a rear portion of the air cleaner box 32 and a distal end of the rear fender 40 are fastened are provided on lower portion of the plate portion 42, and fixing bolt 44A (bolt) is fastened to the fastening portion 44 from the lateral sides. Provided at rear ends of the rear extending portion 43 is a rear fastening boss 45 to which a front portion of the rear fender 40, the seat 25, and the side cover 38 are fastened, and fixing bolt 45A (bolt) is fastened to the rear fastening boss 45 from the lateral side. The mufflers 30 are coupled to the stay plates 41.

Provided between the left and right seat rails 18 is a cross member 46 which couples the left and right stay plates 41.

The air cleaner box 32 is formed into a box shape opening on top, and an air cleaner element 34 configured to purify outside air taken from the outside is demountably mounted in the air cleaner box 32.

Figure 3:
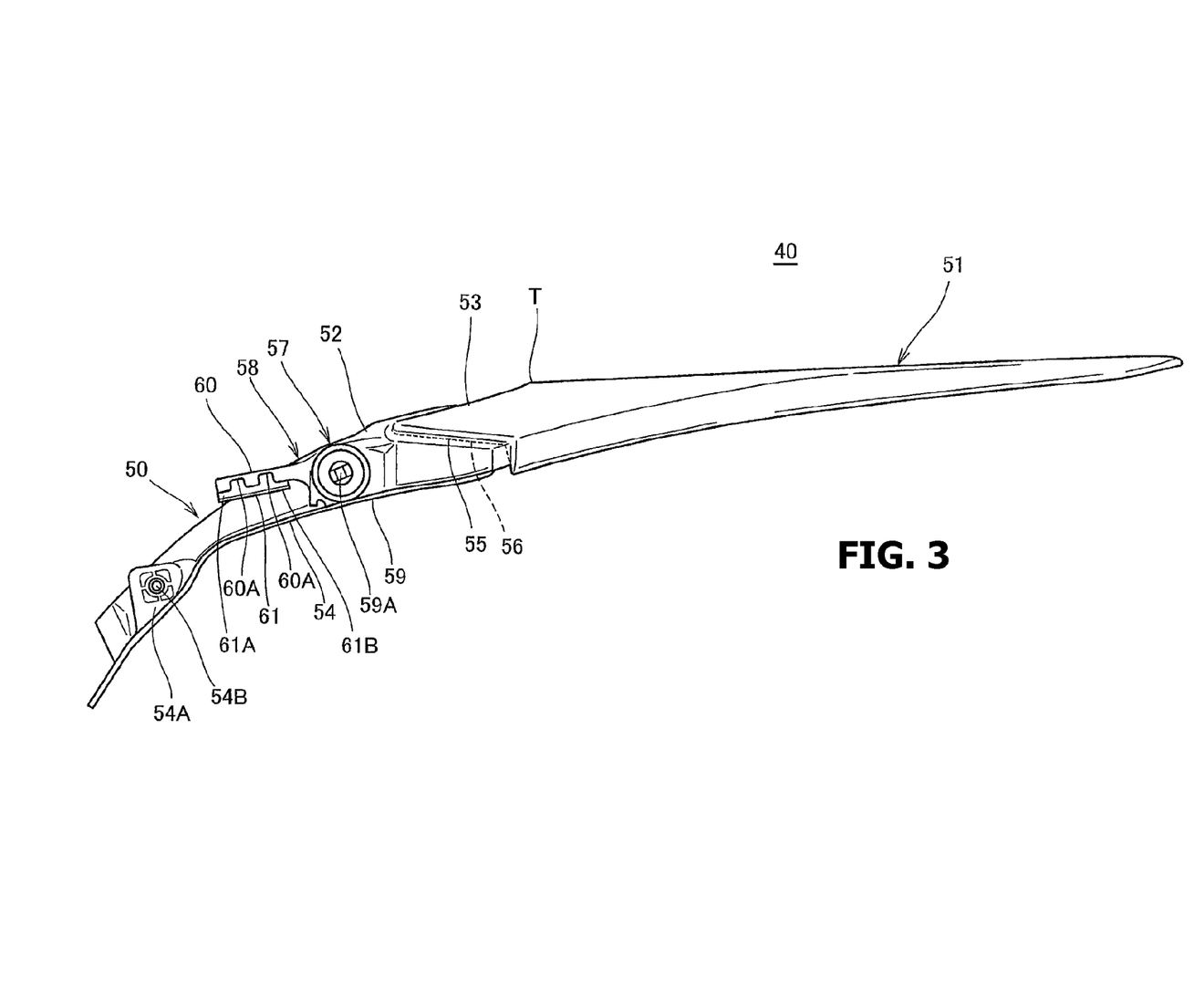
FIG. 3 is a left side view of a rear fender.
Figure 4:
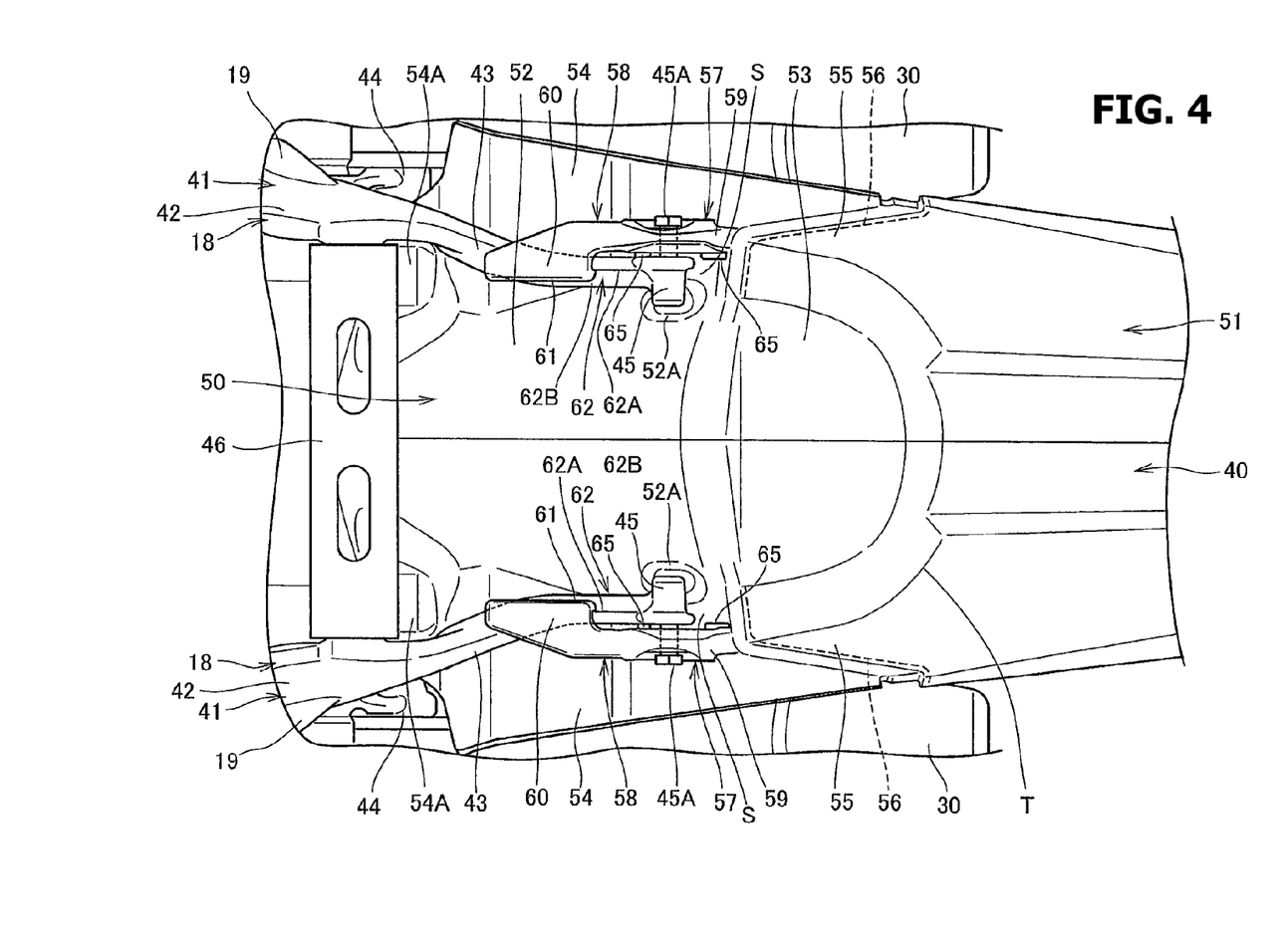
FIG. 4 is a drawing of a fixing portion of the rear fender viewed from the top.

FIG. 3 is a left side view of the rear fender 40. FIG. 4 is a drawing of a fixing portion of the rear fender 40 viewed from above. In FIG. 4, a state in which the seat 25 and the side covers 38 are removed is shown.

The rear fender 40 is formed into a trough shape extending in the fore-and-aft direction, and includes a fender front portion 50, fixed to the seat rails 18 below the seat 25 and curved so as to extend along the rear wheel 3, and a fender rear portion 51 extending below a rear end portion of, and behind the seat 25.

The fender front portion 50 includes a curved surface portion 52 curved along the cross-sectional shape of the rear wheel 3 to project upwardly, a seat-supporting portion 53 continuing from a rear portion of the curved surface portion 52 and configured so as to receive a rear portion of the seat 25, and a pair of flattened plate portions 54, extending laterally from respective left and right edge portions of the curved surface portion 52 and the seat-supporting portion 53.

A pair of front mounting flanges 54A are formed on front portions of the left and right plate portions 54 and project upwardly thereon, and bolt holes 54B are formed through the front mounting flanges 54A for receiving the fixing bolts 44A (FIG. 2).

Mating portions 55 are formed on left and right side portions of a rear portion of the fender front portion 50, and these mating portions project upwardly from inner edges of the plate portions 54. Since the mating portions 55 project upwardly and have an irregular-shaped cross section, the rigidity of the fender is increased and, in addition, since rear ends of the side covers 38 and the rear fender 40 are brought into abutment with, and connect with each other at the mating portions 55, the rigidity and strength are further improved. At the mating portions 55, the rear ends of the side covers 38 come into abutment with outside surfaces of gripping portions 56, and contact the mating portions 55 in a state of being in abutment with the plate portions 54 from above.

The mating portions 55 are the projections in side view, rear surfaces of the mating portions 55 are depressions depressed upward in bottom view, and the depressions are used as the gripping portions 56, which allows the rider or the like to grip. The rider or the like is capable of holding the rear fender 40 by gripping the gripping portions 56 and applying a force upward when pulling the motorcycle M upward or raising the same into an upright position. The gripping portions 56 are formed between the plate portions 54 and the seat-supporting portion 53. The rear ends of the side covers 38 come into abutment with the outside surfaces of gripping portions 56, and mate with the mating portions 55 in a state of being in abutment with the plate portions 54 from above.

A pair of left and right rib-shaped rear mounting members 57 are provided behind the front mounting flanges 54A and in front of the seat-supporting portion 53, and the rear fender 40 is attached to the seat rails 18 via the rear mounting members 57 and the front mounting flanges 54A.

The rear mounting members 57 each include a projecting portion 58 extending forwardly from a front portion of the mating portion 55, for abuttingly contacting an upper surface of the seat rail 18.

Figure 5:
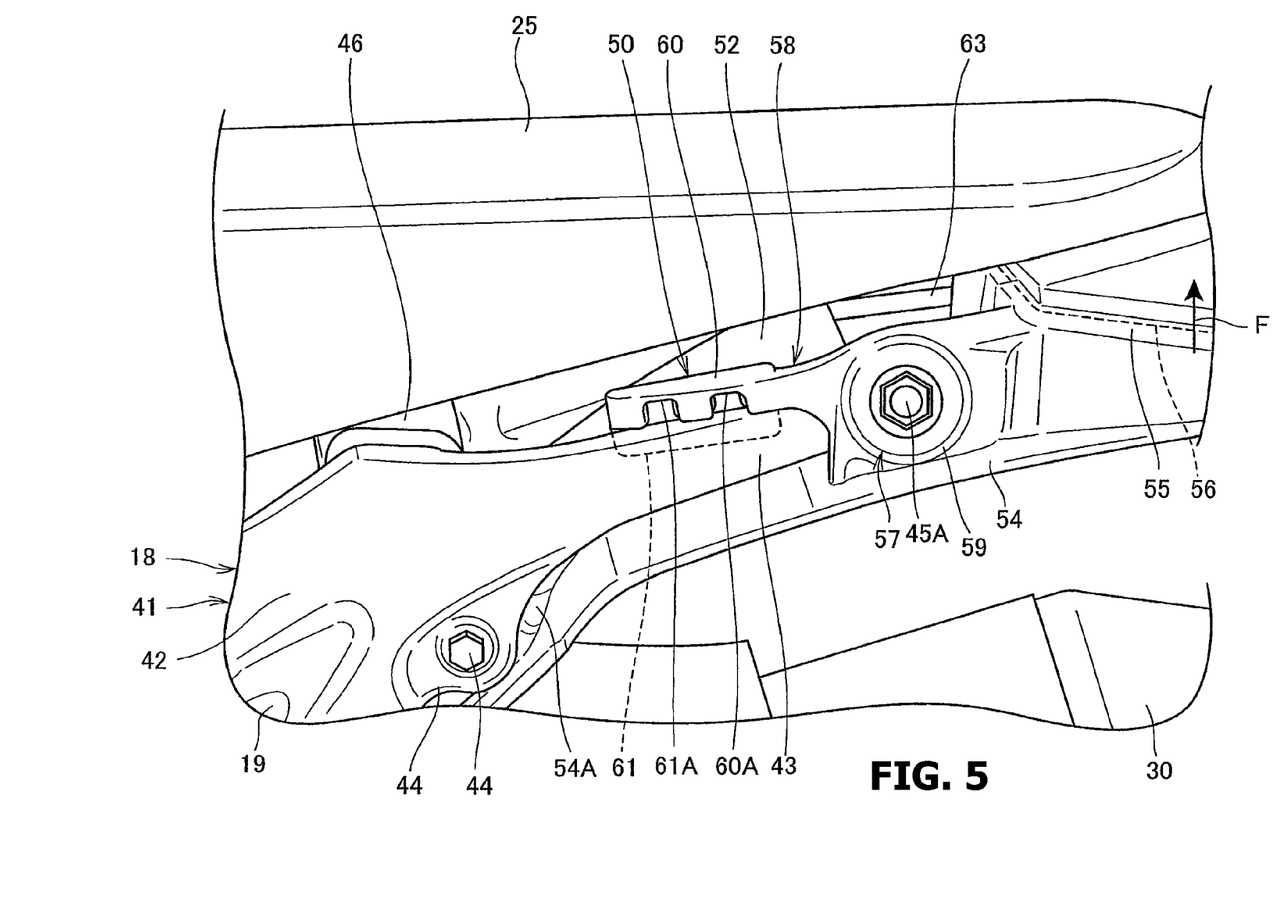
FIG. 5 is a left side view showing a portion in the vicinity of a rear mounting portion.
Figure 6:
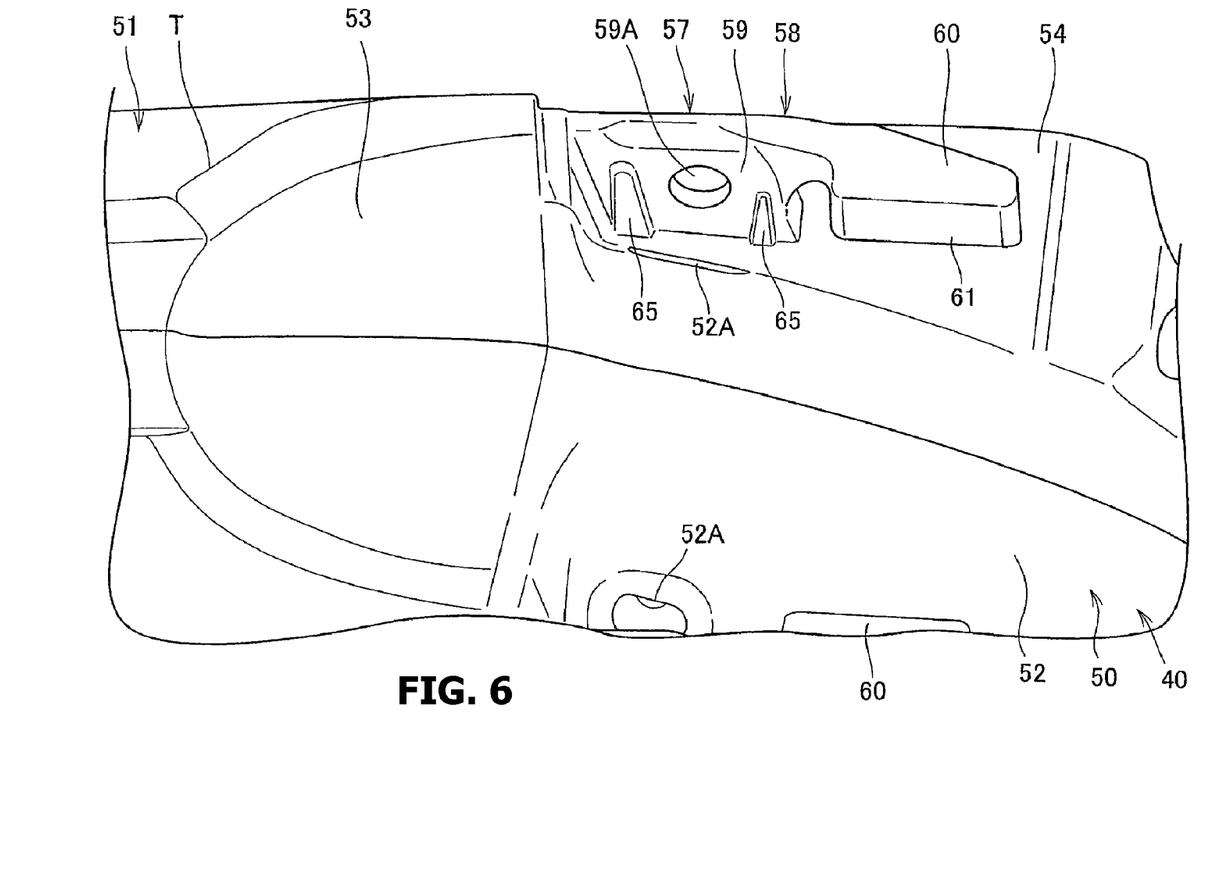
FIG. 6 is a perspective view showing an inner side surface of the rear mounting portion.

FIG. 5 is a left side view showing a portion in the vicinity of the rear mounting portion 57. FIG. 6 is a perspective view showing an inner side surface of the rear mounting members 57. The side covers 38 are omitted from the drawing in FIG. 5 for illustrative purposes.

The rear mounting portion 57 is integrally molded at the time of resin molding of the rear fender 40. As shown in FIG. 3 to FIG. 6, the rear mounting portion 57 includes a plate-shaped base portion 59 extending continuously from side surface portion of the mating portion 55 toward the front over the flat plate portion 54, and the projecting portion 58 extending forwardly from the base portion 59. Each projecting portion 58 includes a lateral rib 60 extending forward from upper front portion of the base portion 59 and projecting inwardly in the vehicle width direction, and vertical ribs 61 projecting downward and extending from the lateral rib 60.

The base portion 59 is located outside with respect to the curved surface portion 52 in the vehicle width direction, and is arranged next to the curved surface portion 52 with a space S interposed therebetween, and the rear extending portion 43 of the stay plate 41 is passed through the space S. The base portion 59 has a bolt hole 59A (FIG. 3) formed therethrough and opening in an outer side surface, and is fixed to the rear fastening boss 45 of the seat rail 18 by a fixing bolt 45A inserted into the bolt hole 59A. The rear fastening boss 45 is formed into a cylindrical shape extending in the vehicle width direction, and the curved surface portion 52 is formed with a depression 52A therein, which avoids interference with the rear fastening boss 45.

The lateral rib 60 extends inward from the outside in the vehicle width direction with respect to the rear extending portion 43, and come into abutment with an upper surface of the rear extending portion 43 so as to be overlapped therewith from above, thereby being positioned in the vertical direction. Plural thinned grooves 60A extending in the vehicle width direction are formed on lower surface of the lateral rib 60, whereby the weight reduction is achieved.

The vertical rib 61 extends downward from an end of the lateral rib 60 on the inner side in the vehicle width direction, and the lateral ribs 60 and the vertical rib 61 are formed into an L-shape in cross-section which provides a high rigidity.

The rear extending portion 43 of the seat rail 18 is formed with a shouldered portion 62 in such a manner that an upper portion of an inner side portion in the vehicle width direction is depressed downward, and the shouldered portion 62 includes an inner side surface 62A (inside of the seat rail) facing inward in the vehicle width direction and an upper surface 62B facing upward so as to continue from a lower end of the inner side surface 62A. The vertical rib 61 is positioned in the vehicle width direction by a side surface portion 61A (FIG. 3) coming into abutment with the inner side surface 62A of the shouldered portion 62 and is positioned in the vertical direction by a lower surface 61B (FIG. 3) coming into abutment with the upper surface 62B of the shouldered portion 62.

A top portion of the seat-supporting portion 53 has a ridge line T having a U-shape in plan view, and the ridge line T is formed along the outline of the rear portion of the seat 25. The projecting portions 58 are substantially aligned with respective ends of the ridge line T in the U-shape, and extend forward in alignment with the ridge line T. The ridge line T is a portion having high rigidity and strength and having an irregularly-shaped cross section, and the rigidity and strength of the projecting portions 58 can be improved by forming the projecting portions 58 substantially continuously from the ridge line T.

Figure 7:
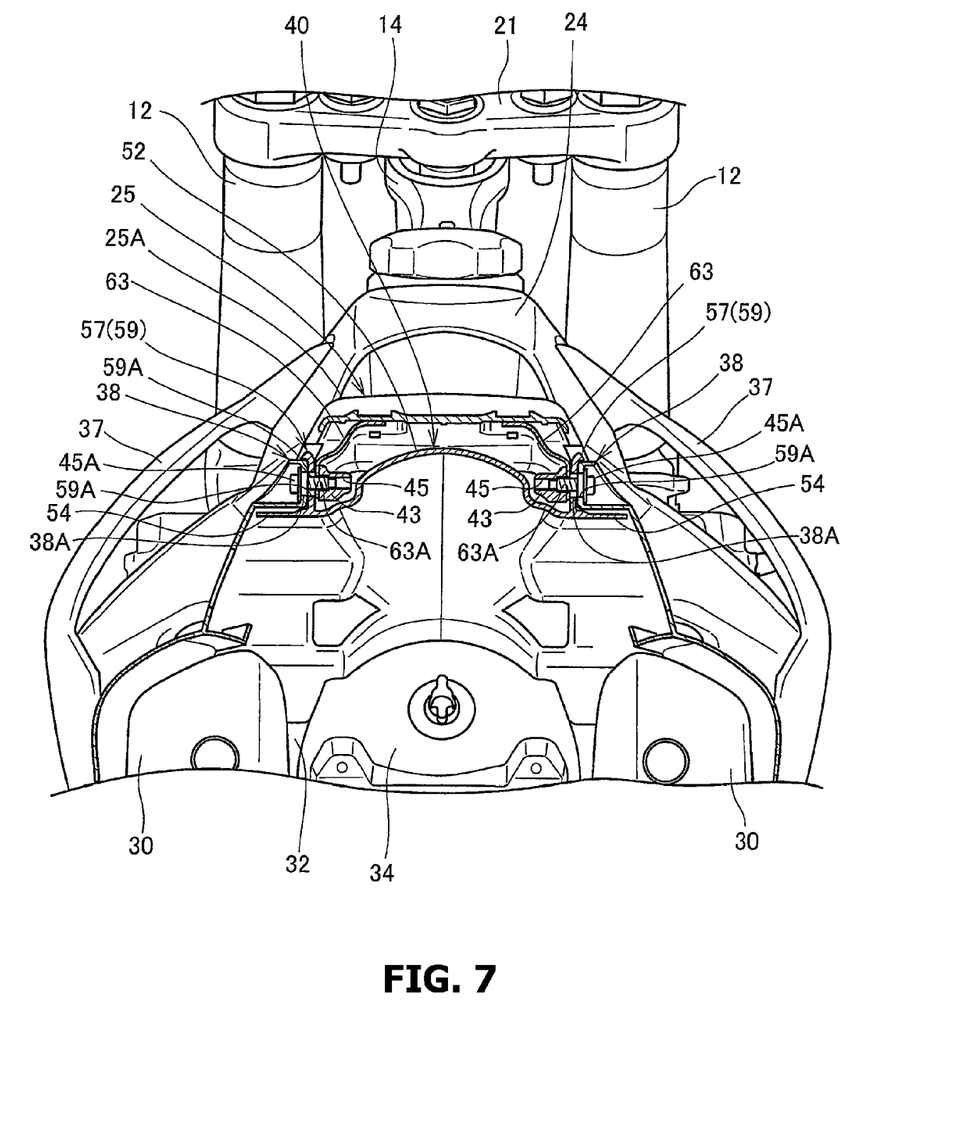
FIG. 7 is a cross-sectional view taken along the line VII-VII in FIG. 1.

FIG. 7 is a cross-sectional view taken along the line VII-VII in FIG. 1.

As shown in FIG. 5 and FIG. 7, the rear portion of the seat 25 is provided with a pair of left and right plate-shaped seat stay portions 63 extending downward form side portions of a seat bottom plate 25A, and fixing holes 63A which allow insertion of the fixing bolts 45A are formed at lower ends of the seat stay portions 63. The seat 25 is fixed to the vehicle body by a locking portion (not shown) provided on a front portion of the seat 25 to be locked with the fuel tank 24 and the seat stay portions 63.

As shown in FIG. 7, on the rear portion of the motorcycle 1, the rear fender 40, the seat 25, and the side covers 38 are fastened together to the rear fastening boss 45 of the seat rails 18 together using a pair of the fixing bolts 45A which are to be fastened from the lateral sides.

More specifically, the rear fender 40 is fitted from below so that the curved surface portion 52 is positioned between the left and right rear extending portions 43 and, in this state, the rear extending portions 43 are positioned between the curved surface portion 52 and the projecting portions 58. The seat 25 is placed on the seat rails 18, and the seat stay portions 63 are inserted between the rear mounting members 57 and the rear fastening boss 45. The side covers 38 include internally threaded bolt hole portions 38A where the fixing bolts 45A are to be inserted, and are set so that the bolt hole portions 38A come into abutment with the outside surfaces of the base portions 59 of the rear mounting members 57. The fixing bolts 45A are fastened from the outsides so as to pass through the bolt hole portions 38A of the side covers 38, the bolt holes 59A of the rear fender 40, and the fixing holes 63A of the seat 25, and these three components are fastened together to the rear fastening portions 45.

As shown in FIG. 4 and FIG. 6, the rear mounting members 57 are each formed with a pair of guide ribs 65 extending inward of the vehicle body in the front and the rear of the bolt holes 59A on inner sides of the base portions 59 of the rib-shaped rear mounting members 57. The guide ribs 65 extend upward and downward so as to guide the seat stay portions 63. The seat stay portions 63 are restricted in positions in the fore-and-aft direction so as to come into abutment with the seat stay portions 63 and cause the fixing holes 63A to communicate with the bolt holes 59A when being inserted between the projecting portions 58 and the rear fastening portions 45. Accordingly, the seat stay portions 63 can be set to adequate portions by the guide ribs 65, so that assembly is facilitated.

Also, as shown in FIG. 2 and FIG. 5, the rear fender 40 is fixed to the seat rails 18 also by the front mounting flanges 54A being fastened to the fastening portions 44 of the stay plates 41. More specifically, at the fastening portions 44, the front mounting flanges 54A of the rear fender 40 and the rear edge portions 32A (rear edge portions of the air cleaner) of the air cleaner box 32 are fastened together by the fixing bolts 44A.

When the air cleaner element 34 is demounted and mounted to perform maintenance of the air cleaner element 34, first of all, the pair of the fixing bolts 45A are removed, and the locking portions of the seat 25 are unlocked, whereby the seat 25 is removed from the vehicle body, and then, the air cleaner element 34 can be demounted from and mounted on a space between the left and right seat rails 18. In this case, by removal of the fixing bolts 45A, fastening between the bolt holes 59A of the rear fender 40 and the rear fastening portions 45 of the seat rails 18 is released and hence the rear fender 40 takes a state of being fastened to the seat rails 18 only by the front mounting flanges 54A. Therefore, it is considered that the rear fender 40 moves downward toward the rear wheel 3 under the weight of the rear fender and mud adhered to the rear fender 40. However, in this embodiment, since the rear fender 40 is supported by the abutment of the projecting portions 58 against the rear extending portions 43 from above, the rear fender 40 can be prevented from moving toward the rear wheel 3 even when the fixing bolts 45A are removed, and hence good serviceability is achieved. Also, since the downward movement of the rear fender 40 can be prevented by providing the projecting portions 58, a rear portion of the rear fender 40 does not have to be fastened with bolts other than the fixing bolts 45A, so that the structure can be simplified, and the weight reduction is achieved.

Also, since the side covers 38 are fastened to the vehicle body by plural fixing portions 68 (FIG. 1) provided forward of the fixing bolts 45A, the position is maintained even when the fixing bolts 45A are removed.

As shown in FIG. 5, when the rider or the like grips the gripping portion 56 and a force F is applied upward, a force acts on the rear fender 40 to rotate the same forward and downward about the fixing bolt 45A, and this force is received by the projecting portion 58 located forward of the fixing bolt 45A coming into abutment with the rear extending portion 43 from above. In this manner, with the provision of the projecting portions 58, the rigidity and strength of the rear fender 40 are increased and hence a larger force can be applied to the gripping portions 56, whereby the rider or the like can grip the gripping portions 56 stably.

As described thus far, according to the embodiment to which the present invention is applied, the rear fender 40 to be mounted on the seat rails 18 includes the projecting portions 58 supported at a front end portion thereof by the front mounting flanges 54A, and extending forward and coming into abutment with the seat rails 18 from above when mounting the rear fender 40. Therefore, when the rear portions of the projecting portions 58 are gripped and a force to lift the same upward acts thereon, the projecting portions 58 come into abutment with the seat rails 18 from above, and work to resist this force. Therefore, with the provision of the projecting portions 58 extending forward on the rear fender 40, the strength and rigidity of the rear fender 40 when the rear fender 40 is lifted upward can be secured without making the rear fender 40 massive.

The rear fender 40 is mounted by fastening the front mounting flanges 54A to the seat rails 18 with the fixing bolts 44A and further is supported by fastening the rear mounting members 57 provided rearward of the front mounting flanges 54A and the rear fastening portions 45 at rear ends of the left and right seat rails 18 with the fixing bolts 45A from the lateral sides, and the projecting portions 58 are formed on the rear fastening portions 45 and extend forward. Therefore, when the rear portions of the rear fastening portions 45 are gripped and a force to lift the same upward acts thereon, the projecting portions 58 come into abutment with the seat rails 18 from above, and work to resist this force. Therefore, the strength and rigidity of the rear fender 40 when the rear fender 40 is lifted upward can be secured without making the rear fender 40 massive.

Also, the gripping portions 56 which are depressions when viewed from the bottom are formed rearward of the rear mounting members 57 of the rear fender 40, the rear mounting members 57 are ribs extending forward and backward, the projecting portions 58 are formed on front portions of the rear mounting members 57, the base portions 59 on rear portions are coupled to the gripping portions 56, and the projecting portions 58 on the front portions of the rear mounting members 57 come into abutment with the seat rails 18 from above when gripping the gripping portions 56 rearward of the rear mounting members 57 and lifting the rear fender 40 upward. Therefore, the strength and rigidity of the rear fender 40 when the rear fender 40 is lifted upward can be secured without making the rear fender 40 massive.

Since the projecting portions 58 are formed into an L-shape in cross-section with the lateral ribs 60 coming into abutment with the upper surfaces of the seat rails 18 and the vertical ribs 61 coming into abutment with the inner side surfaces 62A of the seat rails 18, the rigidity of the projecting portions 58 in the vertical direction and the vehicle width direction can be secured.

Furthermore, with the provision of the plural thinned grooves 60A extending in the lateral direction of the vehicle on the lateral ribs 60, the weight reduction is achieved.

Still further, since the gripping portions 56 are formed so as to have a convex shape in side view as the mating portions 55 between the side covers 38 and the rear fender 40, the strength and rigidity of the gripping portions 56 can be secured. Also, since the seat-supporting portion 53 having the U-shape in plan view is formed on the upper surface of the rear fender 40, and the rear mounting members 57 and the projecting portions 58 are positioned on the extensions of the ridge line T of the seat-supporting portion 53 having the U-shape, the strength and rigidity of the rear mounting members 57 and the projecting portions 58 can be secured.

Also, even when the fixing bolts 45A for fastening the seat 25, the side covers 38, and the rear fender 40 of the rear mounting members 57 together are removed for the maintenance of the air cleaner element 34 of the air cleaner box 32 below the seat 25, the projecting portions 58 come into abutment with the seat rails 18 from above and the rear fender 40 is supported by the seat rails 18, and hence good serviceability is achieved.

Also, since the guide ribs 65 extending inward of the vehicle body are formed in front and rear of the bolt holes 59A of the rear mounting members 57 on the inside of the vehicle body, the seat 25 can be positioned at the positions of the bolt holes 59A by assembling the seat stay portions 63 of the seat 25 along the guide ribs 65, so that the assembly is facilitated.

The above-described embodiment shows only a mode of the invention, and the invention is not limited to the embodiment. In the embodiment described above, the main frame sections 15 have been explained as being provided in left and right pair extending rearward and downward from the head pipe 14. However, the present invention is not limited thereto, and the present invention may be applied to the rear fender to be mounted on the seat rails extending in pair leftward and rightward from the main frame extending singularly from the head pipe 14.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

We claim:

1. A motorcycle comprising:
 a vehicle body frame comprising a head pipe configured to support a steering handlebar thereon via a steering shaft, left and right main frame sections extending rearwardly from the head pipe, left and right pivot plates respectively coupled to rear ends of the main frame sections and extending downwardly, and a pair of left and right seat rails configured to support a seat thereon;
 a swing arm pivotally supported at a front end thereof on the pivot plates via a pivot shaft so as to be pivotally movable thereon, the pivot shaft rotatably supporting a rear wheel at a rear end thereof;
 a pair of left and right reinforcing rods extending between the seat rails and the pivot plates; and
 a rear fender mounted on the seat rails above the rear wheel, wherein the rear fender is supported at a front end thereof by a at least one front mounting portion, and wherein the rear fender includes a pair of projecting portions extending forwardly thereon and contacting the seat rails from above,
 wherein the rear fender is mounted by fastening the front mounting portions to the seat rails with bolts, and is further supported by fastening rear mounting members, provided rearward of the front mounting portions, to rear ends of the left and right seat rails with bolts from lateral sides thereof, and wherein the projecting portions are formed on the rear mounting members.

2. The motorcycle according to claim 1, wherein:
 the rear fender comprises gripping portions disposed behind the rear mounting members and having depressions formed therein;
 the rear mounting members comprise ribs extending in a front-to-rear direction; and
 the rear mounting members are formed with the projecting portions on front portions thereof, and are integrally connected to the gripping portions.

3. The motorcycle according to claim 1, wherein each of the projecting portions is formed into an L-shape in cross section, including a lateral rib which contacts an upper surface of the seat rail, and a vertical rib which contacts an inner side of the seat rail.

4. The motorcycle according to claim 3, wherein the lateral rib is formed with a plurality of thinned grooves therein extending in a vehicle width direction.

5. The motorcycle according to claim 2, wherein:
 side covers, configured to cover side portions of the vehicle body frame are provided;
 the gripping portions are formed so as to have a convex shape in side view as mating portions between the side covers and the rear fender, a seat-supporting portion, formed into a U-shape in plan view, is formed on an upper surface of the rear fender;
 and the rear mounting members and the projecting portions are substantially aligned with a ridge line of the seat-supporting portion.

6. The motorcycle according to claim 1, wherein side covers configured to cover the sides of the vehicle body are provided, an air cleaner is arranged in a space surrounded by the seat rails below the seat and the rear pipes, the rear fender is fastened together to the front mounting portions with rear edge portions of the air cleaner, and the side covers and the seat are both fastened to the rear mounting members.

7. The motorcycle according to claim 1, wherein guide ribs, extending toward the inside of the vehicle body frame, are formed on the inside of the projecting portions in front of and behind bolt holes of the rear mounting members.

8. The motorcycle of claim 1, wherein each of the seat rails has a rear fastening boss formed thereon having a bolt hole formed therein, and wherein a pair of depressions are formed in the rear fender to accommodate the rear fastening bosses.

9. A vehicle body frame and rear fender assembly for a motorcycle, comprising:
 a vehicle body frame comprising a head pipe configured to support a steering handlebar thereon via a steering shaft, left and right main frame sections extending rearwardly from the head pipe, left and right pivot plates respectively coupled to rear ends of the main frame sections and extending downwardly, and a pair of left and right seat rails configured to support a seat thereon, wherein the seat rails are operatively connected to the main frame sections, respectively;
 a pair of left and right reinforcing rods extending between the seat rails and the pivot plates; and
 a rear fender mounted on the seat rails above the rear wheel, wherein the rear fender is supported at a front end thereof by a at least one front mounting portion, and wherein the rear fender includes a pair of projecting portions extending forwardly thereon and contacting the seat rails from above,
 rear mounting members, provided rearward of the front mounting portions, wherein the rear fender is mounted by fastening the front mounting portions to the seat rails with bolts, and is further supported by fastening rear mounting members, to rear ends of the left and right seat rails with bolts from lateral sides thereof, and wherein the projecting portions are formed on the rear mounting members.

10. The frame and fender assembly according to claim 9, further comprising a cross member which interconnects the seat rails.

11. The frame and fender assembly according to claim 10, wherein:
the rear fender comprises gripping portions disposed behind the rear mounting members and having depressions formed therein;
the rear mounting members comprise ribs extending in a front-to-rear direction; and
the rear mounting members are formed with the projecting portions on front portions thereof, and are integrally connected to the gripping portions.

12. The frame and fender assembly according to claim 9, wherein each of the projecting portions is formed into an L-shape in cross section, including a lateral rib which contacts an upper surface of the seat rail, and a vertical rib which contacts an inner side of the seat rail.

13. The frame and fender assembly according to claim 12, wherein the lateral rib is formed with a plurality of thinned grooves therein extending in a vehicle width direction.

14. The frame and fender assembly according to claim 13, wherein:
side covers, configured to cover side portions of the vehicle body frame are provided;
the gripping portions are formed so as to have a convex shape in side view as mating portions between the side covers and the rear fender, a seat-supporting portion, formed into a U-shape in plan view, is formed on an upper surface of the rear fender;
and the rear mounting members and the projecting portions are substantially aligned with a ridge line of the seat-supporting portion.

15. The frame and fender assembly according to claim 10, wherein side covers configured to cover the sides of the vehicle body are provided, an air cleaner is arranged in a space surrounded by the seat rails below the seat and the rear pipes, the rear fender is fastened together to the front mounting portions with rear edge portions of the air cleaner, and the side covers and the seat are both fastened to the rear mounting members.

16. The frame and fender assembly according to claim 10, wherein guide ribs, extending toward the inside of the vehicle body frame, are formed on the inside of the projecting portions in front of and behind bolt holes of the rear mounting members.

17. The frame and fender assembly of claim 10, wherein each of the seat rails has a rear fastening boss formed thereon having a bolt hole formed therein, and wherein a pair of depressions are formed in the rear fender to accommodate the rear fastening bosses.

* * * * *